(12) United States Patent
Carr et al.

(10) Patent No.: US 8,235,422 B2
(45) Date of Patent: Aug. 7, 2012

(54) HEAVY-DUTY VEHICLE FRAME

(75) Inventors: Kimm L. Carr, Canton, OH (US); James G. Copeland, Massillon, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 140 days.

(21) Appl. No.: 12/959,831

(22) Filed: Dec. 3, 2010

(65) Prior Publication Data

US 2011/0127759 A1    Jun. 2, 2011

Related U.S. Application Data

(63) Continuation-in-part of application No. 12/052,865, filed on Mar. 21, 2008, now abandoned.

(60) Provisional application No. 60/896,278, filed on Mar. 22, 2007.

(51) Int. Cl.
    *B62D 21/11*      (2006.01)

(52) U.S. Cl. ......... 280/788; 280/781; 280/785; 280/799

(58) Field of Classification Search .................. 280/781, 280/785, 788, 799
See application file for complete search history.

(56) References Cited

U.S. PATENT DOCUMENTS

| | | | | |
|---|---|---|---|---|
| 1,708,217 A * | 4/1929 | Fraser | 280/124.166 |
| 2,865,652 A * | 12/1958 | Easton | 280/124.107 |
| 3,279,815 A * | 10/1966 | Hutchens | 280/682 |
| 4,953,891 A * | 9/1990 | Zantinge | 280/788 |
| 5,335,932 A * | 8/1994 | Pierce | 280/788 |
| 6,254,132 B1 * | 7/2001 | Lindsay | 280/789 |
| 7,273,230 B2 * | 9/2007 | Kiel et al. | 280/781 |
| 7,909,387 B2 * | 3/2011 | Gosselin et al. | 296/184.1 |
| 8,191,957 B2 * | 6/2012 | Gosselin et al. | 296/184.1 |
| 2003/0038471 A1 * | 2/2003 | Svartz et al. | 280/789 |
| 2006/0170205 A1 * | 8/2006 | Ramsey et al. | 280/789 |
| 2006/0273629 A1 * | 12/2006 | Heiss et al. | 296/203.01 |
| 2009/0014993 A1 * | 1/2009 | Tope | 280/781 |
| 2009/0267338 A1 * | 10/2009 | Gosselin | 280/789 |
| 2010/0171297 A1 * | 7/2010 | North | 280/781 |

* cited by examiner

*Primary Examiner* — Paul N Dickson
*Assistant Examiner* — Nicole Verley
(74) *Attorney, Agent, or Firm* — Krugliak, Wilkins, Griffiths & Dougherty Co., L.P.A.; David P. Dureska; Brent L. Moore

(57) ABSTRACT

A frame for a heavy-duty vehicle includes a pair of spaced-apart, parallel, elongated and longitudinally extending main members. Each one of a pair of hangers is attached to and depends below a respective one of the main members. An axle/suspension system is mounted on the hangers. A vertically disposed brace structure extends between and is attached to the hangers and the main members. The brace structure includes a hanger cross member disposed perpendicularly between the hangers and a pair of inclined members each of which extend between and are attached to the hanger cross member and to a respective one of the main members or to a respective one of the main members and a respective one of the hangers. The brace structure efficiently dissipates loads from the axle/suspension system into the frame adjacent the hangers and eliminates the need for additional cross members within the frame.

6 Claims, 12 Drawing Sheets

HEAVY-DUTY VEHICLE FRAME

This application is a continuation-in-part of U.S. application Ser. No. 12/052,865, filed Mar. 21, 2008, which claims the benefit of U.S. Provisional Application No. 60/896,278, filed Mar. 22, 2007.

BACKGROUND OF THE INVENTION

1. Field of the Invention

The invention relates generally to heavy-duty vehicle frames, and in particular to frames for heavy-duty vehicles such as semi-trailers. More particularly, the invention is directed to a frame which includes one or more vertical bracing structures that replace one or more of the transversely-extending cross members of conventional frames, and which minimizes the need for large and/or numerous gussets, braces and the like that are generally associated with such frames. The frame of the invention more securely supports one or more axle/suspension systems suspended from the frame and more efficiently reacts loads imposed on the frame during operation of the vehicle, while reducing the overall weight and cost of the frame.

2. Background Art

Heavy-duty vehicles, such as tractor-trailers or semi-trailers, typically include one or more suspension assemblies that connect the wheel-bearing axles of the vehicle to the frame of the vehicle. Conventional or prior art frame designs were developed before the advent of air suspension systems for trailers. At that time, spring suspension systems were the suspension of choice for trailers. However, the spring suspension system resulted in a relatively rough ride to the cargo and did not equalize in all situations, thus creating the need for a frame design with soft ride characteristics and efficient equalization characteristics. The subsequent development of air suspension systems provided improved ride quality for individual axles of semi-trailers as well as load equalization among multiple axles.

Load equalization is important because the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. Therefore, the use of air suspension systems that can provide greater load equalization among multiple axles is preferred in order to enable the vehicle to carry as much cargo as is legally allowed. In addition, within the trucking industry, reducing the weight of carrier equipment without sacrificing durability directly improves productivity by increasing the available payload that can be transported by the vehicle. Unfortunately, prior art frames equipped with air suspensions have generally added unwanted weight to the trailer, primarily because those frames were originally built to support leaf spring suspensions and adapting them to incorporate air suspensions required additional bracing and support, such as gussets, braces and the like.

Furthermore, vehicles containing more than one non-steerable axle, including semi-trailers, are subject to lateral or side loads. Lateral loads can act through the frame in opposite directions creating significant twisting torsional loads on the frame. Moreover, a frame is also subjected to strong vertical and longitudinal loads. A durable frame design must effectively react all such loads. Conventional prior art frame designs control vertical loads by utilizing rigid, and therefore heavy, main members and cross members. However, such a rigid structure fails to minimize the effect of lateral and longitudinal loads on the frame. As a result, conventional prior art frame designs have attempted to minimize the effect of lateral and longitudinal loads by utilizing a plurality of gussets, braces and the like variously attached to the cross members, to the frame hangers, to the air springs of the axle/suspension system, and/or to the main members. More particularly, these gussets, brackets and the like typically were attached to and extended between the main members, the cross members and the main members, the cross members and the frame hangers, and the air springs and the main members. These gussets, braces and the like, although helpful in aiding the frame in reacting loads imparted on the frame by the axle/suspension system during operation of the vehicle, add unwanted weight to the vehicle which ultimately reduces the amount of cargo that can be carried by the vehicle.

In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

More specifically, prior art primary frame designs typically utilize a pair of elongated, longitudinally-extending, spaced-apart, parallel I-beam main members, having a plurality of generally C-shaped cross members which extend between and are connected to the main members. A plurality of generally triangular-shaped gussets typically are attached to and extend between the cross members and the main members and between the air springs and the main members. Additional gussets are also attached to the main members in the vicinity of their respective hangers. Each one of a pair of braces having a generally L-shaped cross section extends diagonally between and is attached to its respective frame hanger and the adjacent cross member. An additional pair of braces each having a generally C-shaped cross section extends diagonally between and is attached to the main members. This frame structure, as mentioned above, is heavy and does not efficiently react lateral and longitudinal loads on the frame.

Thus, the need exists for a frame for a heavy-duty vehicle that is stronger, reacts loads more efficiently, is less costly to manufacture, and is lighter than prior art conventional frame designs. These improvements are provided by the heavy-duty vehicle frame of the present invention which provides a frame for semi-trailers having significantly reduced weight than that found in prior art frames yet has improved strength and capability for more efficiently reacting vertical, longitudinal, roll, and lateral loads. In addition, the present invention provides a frame for semi-trailers, which can be more efficiently manufactured than prior art frames.

SUMMARY OF THE INVENTION

The objectives of the present invention include providing a frame which optimizes frame structure while reducing the number of or eliminating heavy cross members located between the main members for more efficiently reacting loads imparted to the frame by the axle/suspension system during operation of the vehicle.

Another objective of the present invention is to provide a frame which reduces the overall weight of the frame as compared to prior art frame designs.

Yet another objective of the present invention is to provide a frame that is stronger and more economical to manufacture than prior art frame designs.

These objectives and advantages are obtained by the frame for a vehicle trailer, the frame including: a pair of spaced-apart, parallel, elongated and longitudinally extending main members; a pair of hangers, each one of the hangers being attached to and depending below a lowermost surface of a respective one of the main members; and a vertically disposed brace structure extending between and being attached to the hangers and the main members, the brace structure including a hanger cross member spaced from the main members and disposed perpendicularly only between the hangers, and a pair of inclined members, each one of the inclined members extending between and being attached to the hanger cross member and to a respective one of the main members or to a respective one of the main members and a respective one of the hangers.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
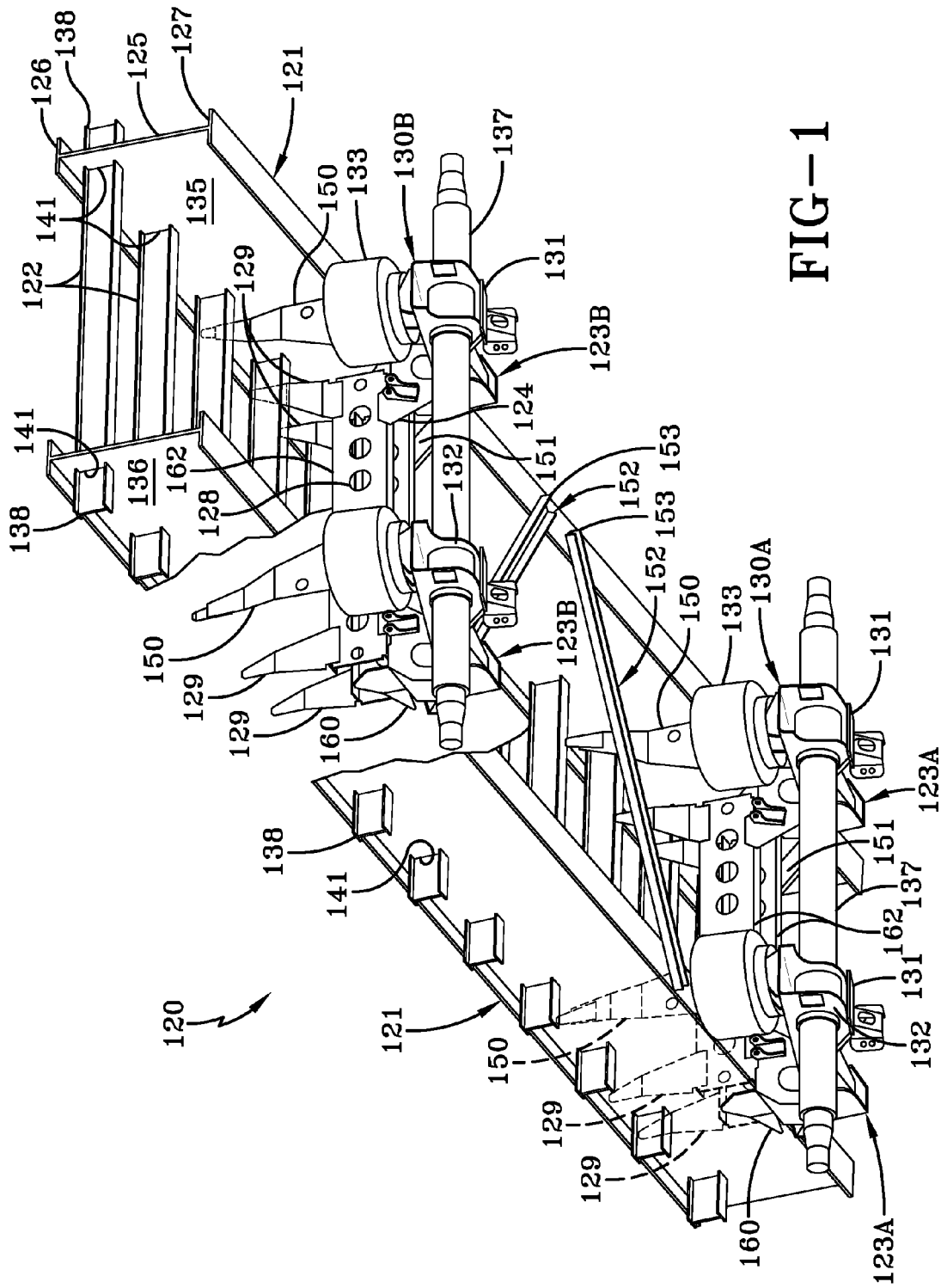
FIG. 1 is a fragmentary bottom-rear driver's side perspective view of a prior art primary frame for a semi-trailer, having a pair of longitudinally-extending, spaced-apart main members and a plurality of transversely-extending, spaced-apart floor sills, two pairs of spaced-apart, transversely-extending cross members, and a plurality of triangular-shaped gussets, and showing a pair of axle/suspension systems mounted on and depending from the primary frame via pairs of hangers mounted on the frame.
Figure 2:
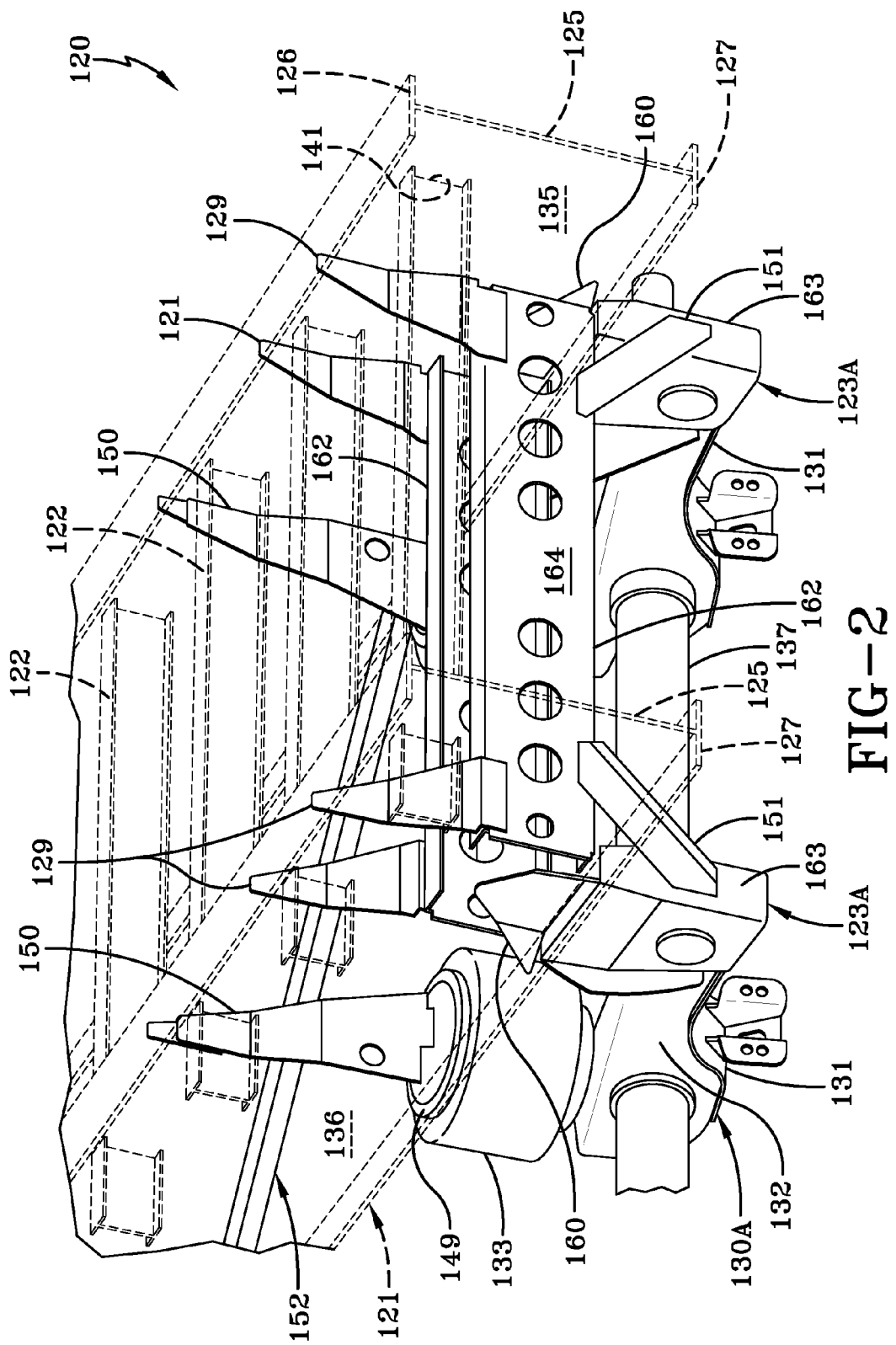
FIG. 2 is an enlarged fragmentary top-front passenger's side perspective view of the primary frame and axle/suspension systems shown in FIG. 1, with portions thereof represented by broken lines.
Figure 3:
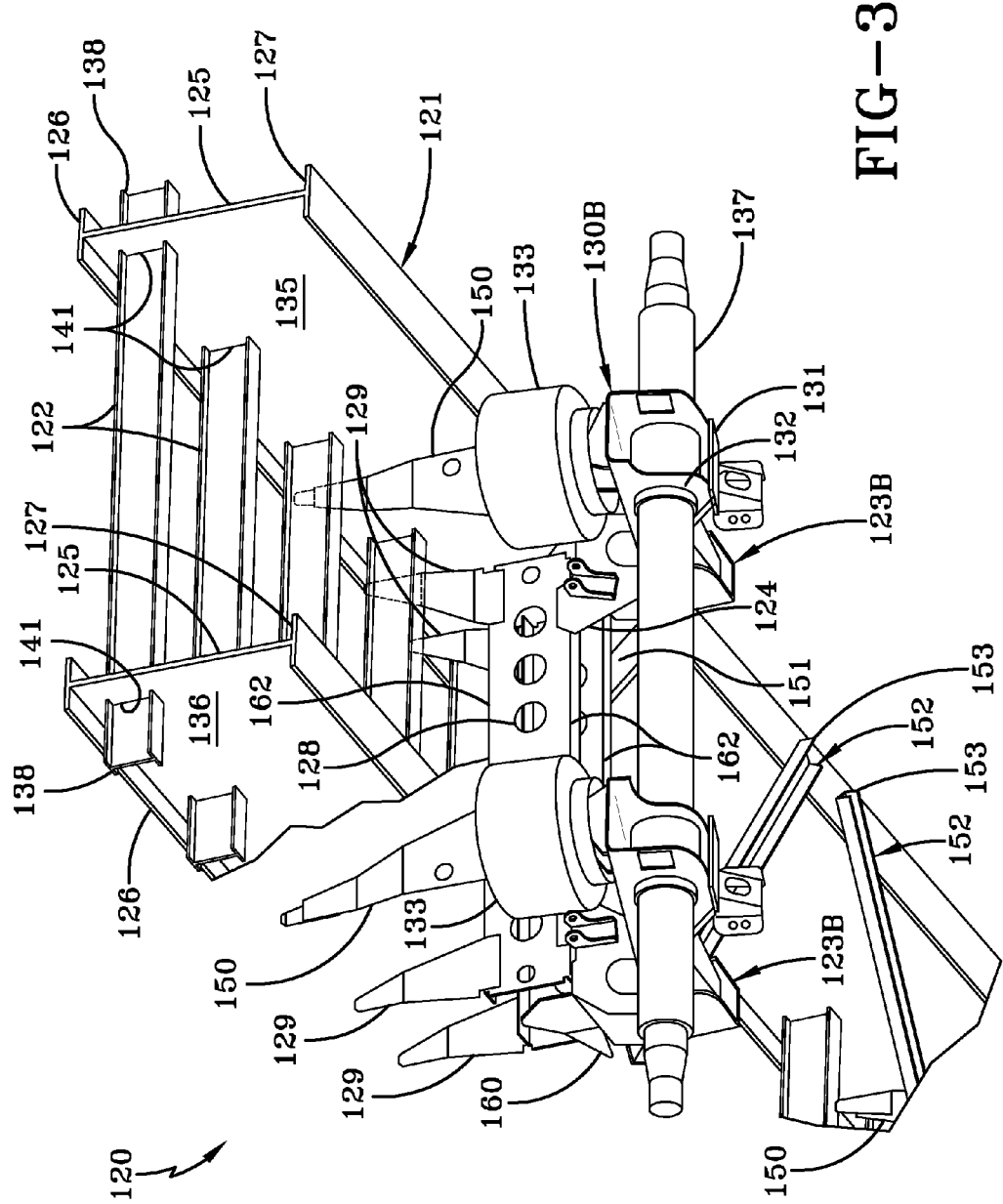
FIG. 3 is an enlarged fragmentary bottom rear driver's side perspective view of the primary frame and axle/suspension system shown in FIG. 1.

Heavy-duty vehicles, such as tractor-trailers or semi-trailers, typically include leading or trailing arm suspension assemblies that connect the frame of the vehicle to the axles of the vehicle. For purposes of illustration and so that the structure and benefits of the present invention frame can best be understood, a prior art primary frame for a semi-trailer is indicated generally at 120 and is shown in FIGS. 1-3. Primary frame 120 includes a pair of longitudinally-extending main members 121, a plurality of cross members 162, a pair of generally transversely-extending horizontal braces 152, and a plurality of gussets and braces 129, 150, 151, 160. A plurality of floor sills 122 also extend transversely between main members 121 for supporting the floor (not shown) of the trailer. Front and rear pairs of hangers 123A and 123B, respectively, are attached to and depend from primary frame 120 for suspending axle/suspension systems 130A and 130B.

More specifically, each main member 121 is an elongated, longitudinally-extending, generally I-shaped beam made of a metal such as steel or other suitable robust material, and the other components of primary frame 120 are also formed of steel or other similar robust material unless otherwise noted. Main members 121 are connected to each other in spaced-apart parallel relationship by cross members 162, which extend between and are perpendicular to main members 121. Each I-shaped main member 121 includes a vertical web or wall 125 and upper and lower flanges 126,127, respectively. Each main member vertical wall 125 includes an inboard surface 135 and an outboard surface 136. Each cross member 162 is generally C-shaped and includes a plurality of aligned openings 128 that allow passage of electrical and air conduits (not shown) longitudinally along the length of the frame and which reduce weight. More particularly, longitudinally spaced-apart pairs of parallel, opposed cross members 162, are disposed perpendicularly between main members 121, with the open portion of each pair of the cross members facing one another. One pair of cross members 162 is positioned generally above front hangers 123A, and a second pair of cross members 162 is positioned generally above rear hangers 123B. Specifically, each end of each cross member 162 is attached to inboard surface 135 of vertical wall 125 and the inboardly extending portion of lower flange 127 of a respective one of main members 121, by any suitable means such as welding or mechanical fastening.

Front and rear pairs of transversely-spaced hangers 123A, B, respectively, are mounted on and depend from main members 121 and selected ones of cross members 162. More specifically, each one of the front pair of hangers 123A is transversely-spaced apart from the other hanger and rear hangers 123B are longitudinally-spaced from the front hangers. Each hanger 123A,B is attached to the bottommost surface of flange 127 of its respective main member 121 by any suitable means such as welding or mechanical fastening. A shock mount gusset 124 is formed on the inboard side of each of hangers 123A,B, and extends generally inboardly upwardly to attach to the rearward vertical surface of its respective cross member 162 located generally directly above the hanger by any suitable means such as welding or mechanical fastening.

Front and rear axle/suspension systems 130A,B, respectively, are pivotally connected to front and rear pairs of hangers 123A,B. Inasmuch as each axle/suspension system 130A,B is suspended from primary frame 120, but does not form an integral part thereof, only the major components of the axle/suspension system will be cited for aiding in the description of the environment in which the prior art primary frame operates. Each axle/suspension system 130A,B includes generally identical suspension assemblies 131 suspended from each one of the pair of hangers 123A,B, respectively. Each suspension assembly 131 includes a suspension beam 132, which is pivotally mounted on a respective one of hangers 123A,B in a usual manner. An air spring 133 is suitably mounted on and extends between the upper surface of the rearwardmost end of suspension beam 132 and main member 121. A shock absorber (not shown) extends between and is mounted on suspension beam 132 and shock mount gusset 124 of frame hanger 123 in a manner well known in the art. An axle 137 extends between and is captured in the pair of suspension beams 132 of each axle/suspension system 130A, B.

A plurality of longitudinally-spaced generally I-shaped openings 141 are formed in the upper portion of vertical wall 125 near upper flange 126 and along the length of each one of main members 121 and are each aligned with a corresponding I-shaped opening formed in the other main member. A plurality of floor sills 122 each extend perpendicularly between main members 121 and respective aligned ones of I-shaped openings 141. Each end 138 of each floor sill 122 passes through its respective opening 141 and extends outboardly therefrom and is fixedly attached to main member 121 by any suitable means such as welding or mechanical fastening.

A triangular-shaped cross member gusset 129 is attached to each end of each cross member 162 and to the respective upper portion of inboard surface 135 of vertical wall 125 of a respective one of main members 121, by any suitable means such as welding or mechanical fastening. Cross member gussets 129 serve as additional bracing for cross members 162 and aid in distributing loads imparted on the cross members by axle/suspension systems 130A,B during operation of the vehicle. An air-spring gusset 150 is attached to an upper metal plate 149 located on the uppermost surface of each air spring 133 and to inboard surface 135 of vertical wall 125 of its respective main member 121, and also to the inboard side of lower flange 127, also by any suitable means such as welding or mechanical fastening, as best shown in FIG. 2. Air spring gussets 150 serve as additional bracing for air spring 133 and aid in the distribution of forces from the air spring to main members 121 during vehicle operation. A hanger cross member gusset 151, having a generally L-shaped cross section, is attached to a front vertical surface 163 of each hanger 123 and a frontwardmost vertical surface 164 of its respective cross member 162, located directly above the hanger. Hanger cross member gussets 151 serve as a brace for hanger 123 and aid in the distribution of side loads that are imparted on the hanger by axle/suspension systems 130A,B during operation of the vehicle. A pair of horizontal braces 152 are arranged diagonally beneath main members 121. More specifically, each one of horizontal braces 152 is elongated, includes a generally U-shaped cross section and has a pair of ends 153. Each end 153 of each horizontal brace 152 is attached to the bottommost surface of flange 127 of a respective one of main members 121 by any suitable means of attachment, such as welding or mechanical fastening. Once attached, the open portion of horizontal brace 152 faces in a generally downward direction. Each one of a plurality of hanger gussets 160 is attached to outboard surface 136 of vertical wall 125 of a respective one of main members 121 and to the upper outboard portion of lower flange 127 directly above respective ones of hangers 123A,B, by any suitable means of attachment such as welding or mechanical fastening. Hanger gussets 160 aid in distributing loads imparted on the frame of the vehicle by the hangers during operation of the vehicle.

Heavy-duty vehicle primary frames should be constructed so that they can withstand the various load conditions that a trailer will be subjected to during movement or operation of the semi-trailer. Vehicles containing more than one non-steerable axle, such as semi-trailers, are subjected to lateral or side loads. Such lateral loads, in the case of drag turns, are directed through the primary frame hangers in opposite transverse directions into primary frame 120. Longitudinal loads may also adversely affect primary frame 120. The torsional or racking effect of such lateral and/or longitudinal loads on primary frame 120 can be significant. Horizontal braces 152 are often added to the primary frame in order to counteract or control the effects of these torsional or racking loads. In addition to the side or lateral and fore-aft or longitudinal loads, primary frames must be capable of withstanding extreme vertical loads inputted through the suspension assemblies and hangers. Prior art primary frame 120 and similar designs thus attempt to control the adverse affect produced by vertical loads by using rigid, and therefore heavy, main members 121 and cross members 162, and by using a plurality of gussets 129,150,151,160 associated with each of the cross members, hangers, air springs and/or main members. Prior art primary frame 120 also exhibits a design that attempts to control adverse vertical loads by using rigid, heavy opposing cross members 162. Although the heavy and rigid conventional cross member configuration optimizes the capability of prior art primary frames such as primary frame 120 to withstand vertical loads, the ability of such prior art primary frame designs to withstand lateral and longitudinal loads is less than optimum. This is because the resulting racking effect on the rigid and heavy primary frame causes high stress at the joints of cross members 162 and main members 121 and ultimately can reduce the life of the primary frame. In order to relieve these high stress areas at the joints between cross members 162 and main members 121, prior art primary frame designers have added gussets 129,150,151, 160 that attach to the primary frame and in some instances to various components attached to the primary frame. However, these gussets add additional weight to the frame of the vehicle and also add additional material cost and time to the manufacturing process.

It is understood that prior art subframes also typically include gussets like those described above. Likewise, these gussets add additional weight to the subframe of the vehicle and also add additional material cost and time to the manufacturing process.

Therefore, a need exists in the art for a heavy-duty vehicle frame design that eliminates or minimizes the need for heavy cross members and gussets, braces and the like, and provides a lighter, easier to manufacture, frame design that is better able to react the vertical, longitudinal, racking and torsional loads imparted on the frame from the axle/suspension system during operation of the vehicle.

Figure 4:
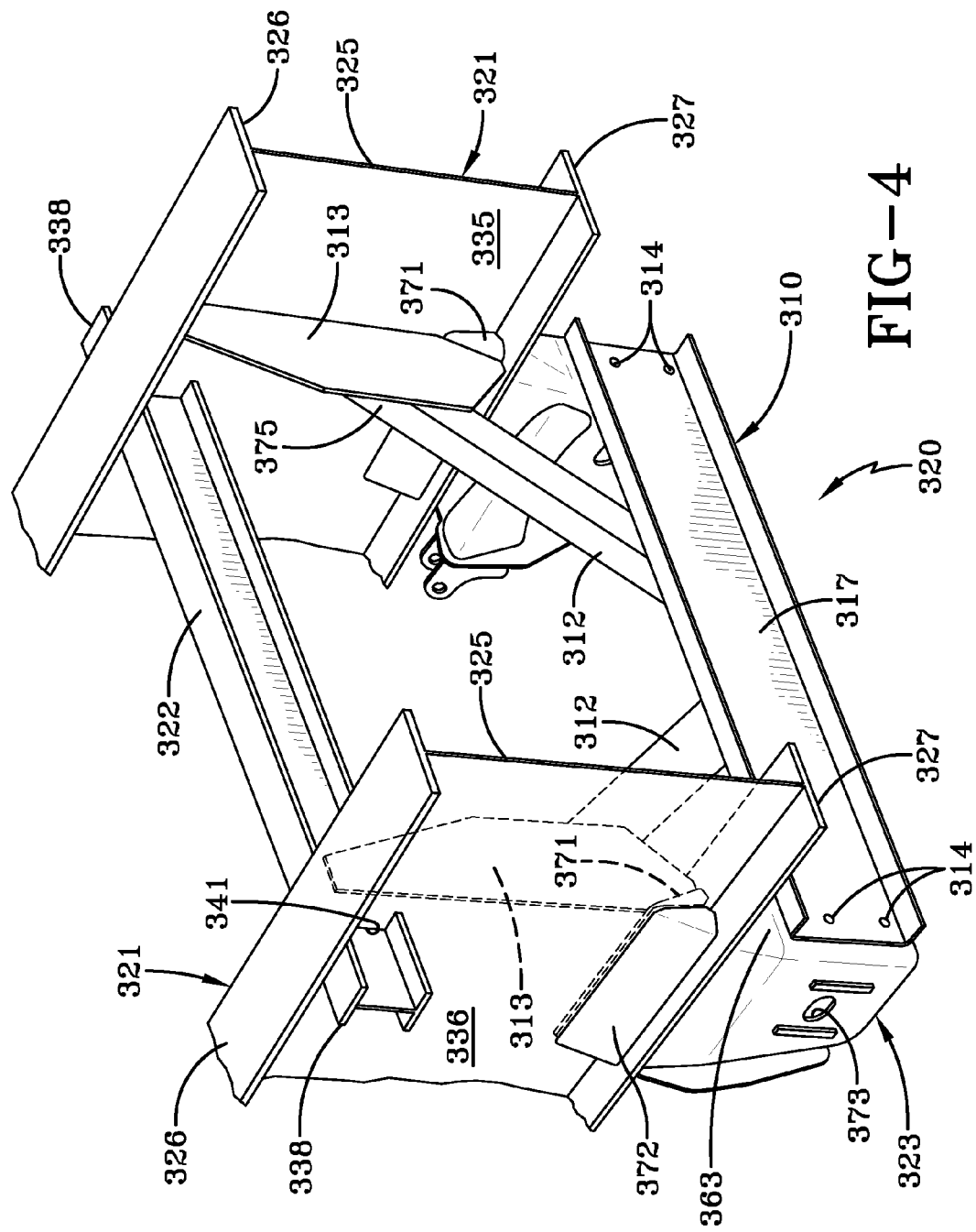
FIG. 4 is a fragmentary top-front passenger's side perspective view of the first embodiment heavy-duty vehicle primary frame of the present invention, with hidden portions represented by broken lines, and showing a pair of spaced-apart longitudinally extending main members with depending hangers, a vertical cross-brace structure attached to the hangers and the main members, and a floor sill.

A first preferred embodiment of the present invention, and specifically an improved heavy-duty vehicle primary frame, is indicated generally at 320, is shown in FIG. 4, and is an improvement over prior art primary frame 120 shown in FIGS. 1-3 and described hereinabove. In particular, although primary frame 320 of the present invention is similar in limited respects to prior art primary frame 120, the primary frame of the present invention is different from the prior art primary frame in many respects, thereby contributing to the improved performance of the primary frame of the present invention over this and other similar prior art primary frames. The structural and resulting performance differences between primary frame 320 of the present invention and prior art primary frame 120 will be described in detail below.

Specifically, as seen in FIG. 4, improved primary frame 320 includes a pair of elongated, longitudinally-extending and spaced-apart main members 321, front and rear vertical cross-brace structures 310 (only front structure shown) each attached to respective front and rear pairs of hangers 323 (only front hangers shown) for suspending axle/suspension systems (not shown) of the type generally described hereinabove for prior art primary frame 120, and a plurality of transversely-extending floor sills 322 (only one shown).

More particularly, each main member 321 is an I-beam made of steel, aluminum, composite, or other suitable material. Main members 321 are connected to each other in spaced-apart parallel relationship by front and rear vertical cross-brace structures 310 (only one shown) and a plurality of transversely extending, spaced-apart and parallel floor sills 322 (only one shown). Each I-shaped main member 321 includes a vertical wall 325 and upper and lower flanges 326, 327, respectively. Each main member vertical wall 325 includes an inboard surface 335 and an outboard surface 336. Each hanger 323 is attached to a bottom surface of lower flange 327 of a respective one of main members 321 by any suitable means, such as welding, and preferably is of a wingless-type as is well known in the art. Hangers 323 are each formed of steel or other suitable robust material for mounting a suspension assembly on each of the hangers in a manner well-known to those of ordinary skill in the art.

Figure 5:
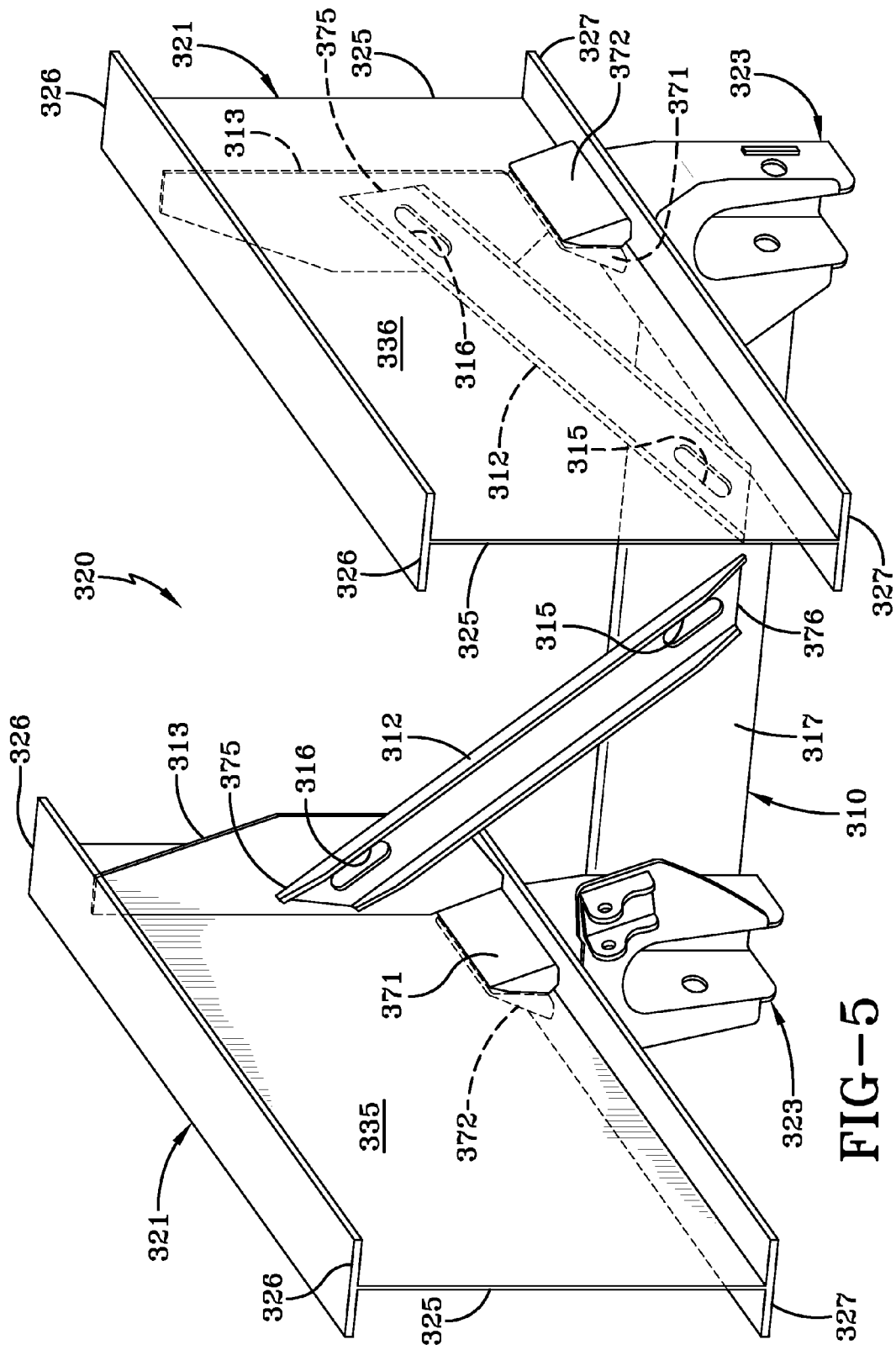
FIG. 5 is an enlarged fragmentary top-rear passenger's side perspective view, with hidden portions represented by broken lines, of the primary frame shown in FIG. 4.
Figure 7:
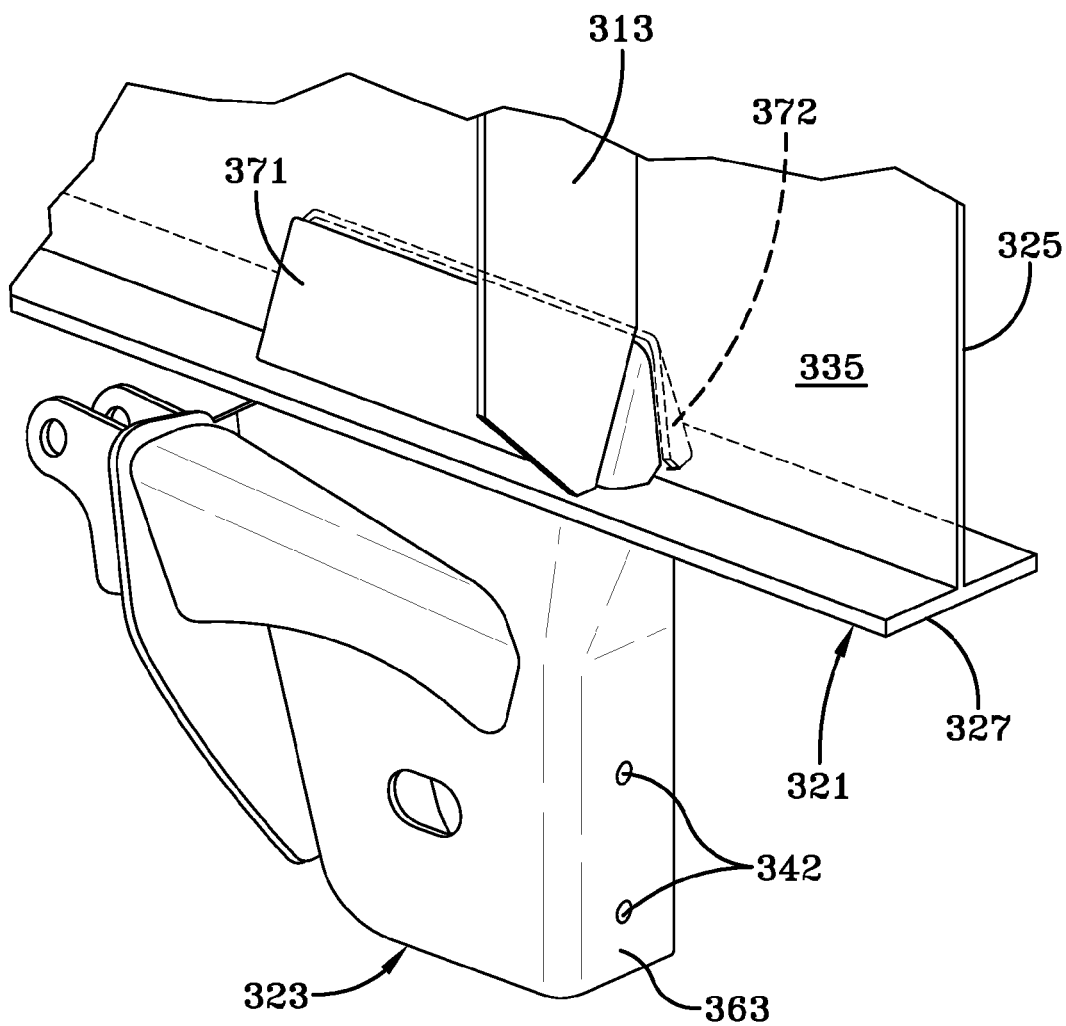
FIG. 7 is a greatly-enlarged fragmentary front perspective view, with hidden portions represented by broken lines, of the primary frame shown in FIGS. 4-6, but with portions of the vertical cross-brace structure removed, and looking in an outboard direction toward the driver's side of the frame.

In accordance with one of the main features of the present invention, a vertical cross-brace structure 310 extends between main members 321 and hangers 323, as shown in FIGS. 4 and 5. Vertical cross-brace structure 310 includes a generally C-shaped, frontward-facing, horizontally disposed, transversely-extending base member 317 having a pair of ends, with each base member end being attached to a front surface 363 of a respective one of hangers 323, by any suitable means such as welding or bolts (not shown). A pair of alignment guides 314 are located at each end of base member 317 for aligning the base member with corresponding guides 342 located on hangers 323 (FIG. 7). Additionally, vertical cross-brace structure 310 includes a pair of generally C-shaped, rearward-facing inclined members 312, each of which has an upper end 375 and a lower end 376. Lower end 376 of each inclined member 312 is attached to the rear surface of base member 317 generally at its central portion, by suitable fasteners such as welds (not shown) applied at openings 315 formed in each of the lower ends of the inclined members. Upper end 375 of each inclined member 312 is attached to a rear surface of a respective one of a pair of inboardly extending plates 313, by welds (not shown) applied at openings 316 formed in each of the upper ends of the inclined members. Each plate 313 preferably is welded to inboard surface 335 of vertical wall 325 of a respective one of main members 321. More particularly, each plate 313 extends vertically between and abuts the lower inboard surface of upper flange 326 and the upper inboard surface of lower flange 327, as well as inboard surface 335 of vertical wall 325. As best seen in FIGS. 4 and 5, vertical cross-brace structure 310 is a generally K-shaped structure that is rotated ninety degrees counterclockwise. Vertical cross-brace structure 310 functions to react the lateral loads imparted on the primary frame from the axle/suspension systems during operation of the vehicle through compression and tension of base member 317 and inclined members 312, which also transmit these lateral forces into main members 321 via plates 313. This structure reduces or minimizes the number of typically large and heavy cross members, braces, gussets and the like that are required to make prior art primary frame 120 strong enough to react loads imparted on the frame by the axle/suspension system during operation of the vehicle. For example, the present invention eliminates heavy cross members 162 that extend between the main members. The present invention also minimizes the number and size of gussets, such as gussets 129, 150 and 160, and eliminates wings of the type that are well known in the art, on hanger 323.

Figure 6:
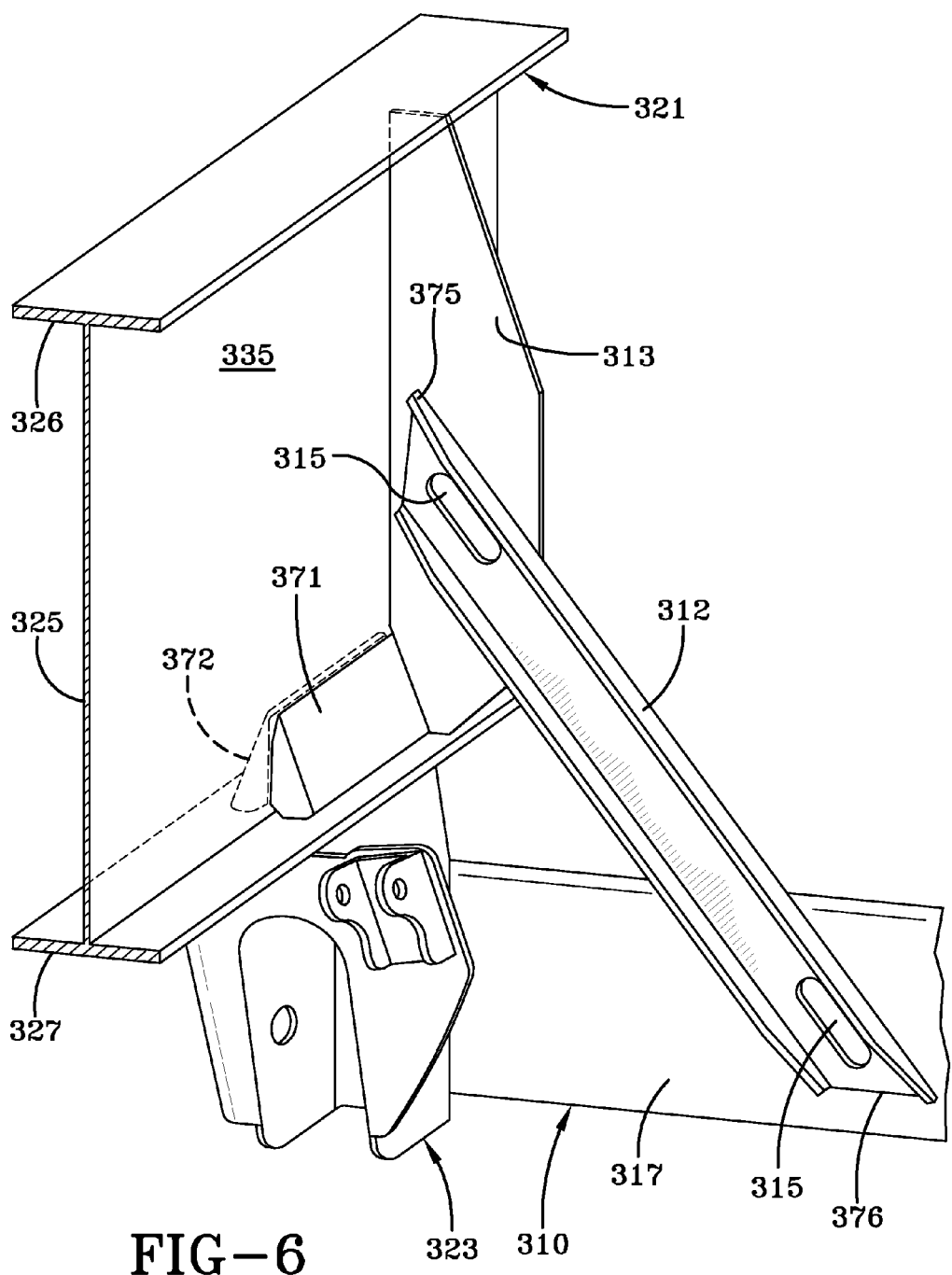
FIG. 6 is a greatly-enlarged fragmentary rear perspective view, with hidden portions represented by broken lines and portions shown in section, and looking in an outboard direction toward the driver's side, of the primary frame shown in FIGS. 4 and 5.
Figure 8:
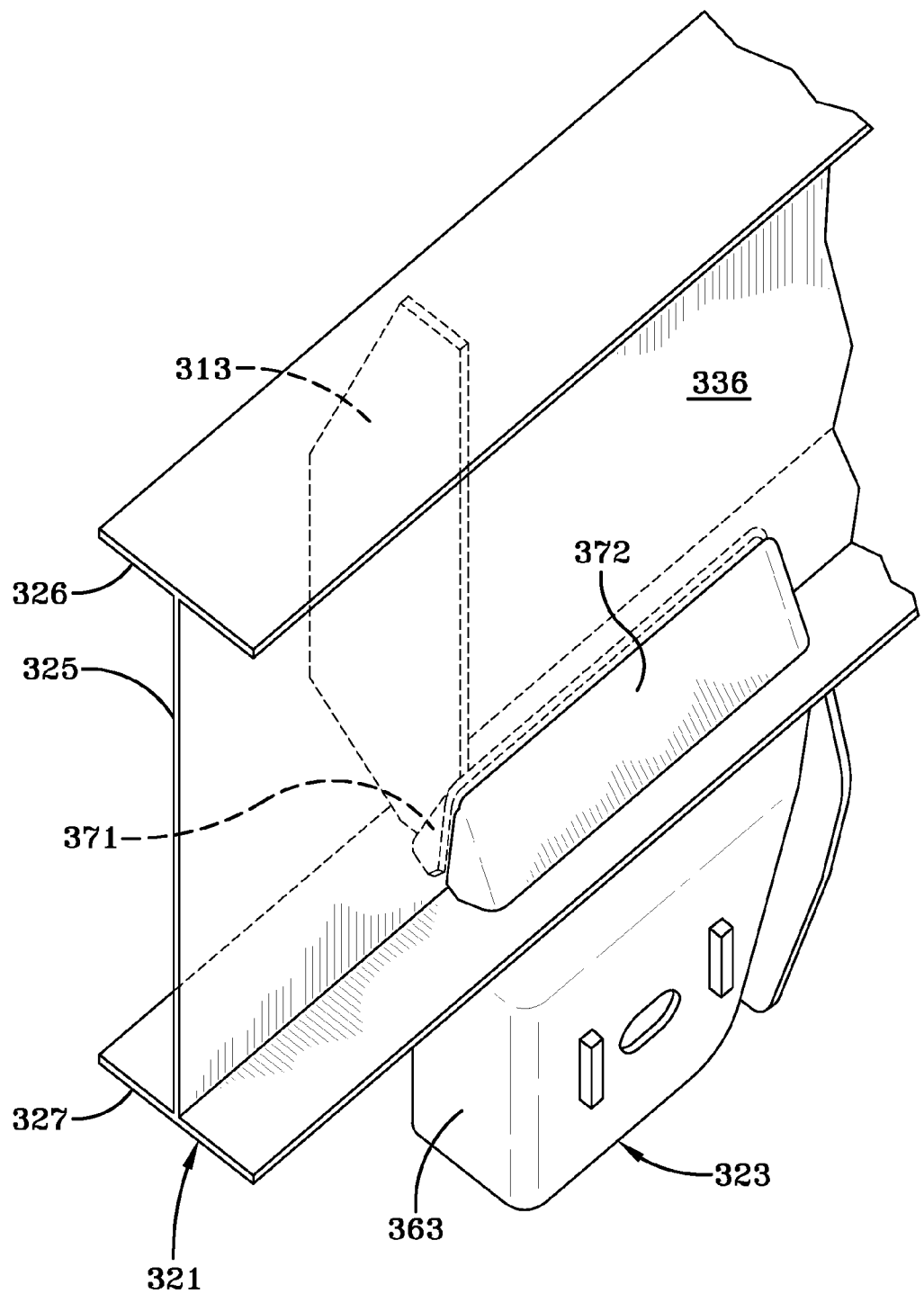
FIG. 8 is a view similar to FIG. 7, but looking in an inboard direction and with portions of the main member broken away.

Each one of a pair of small inboard hanger gussets 371 is attached by welding or other suitable means, to the bottom inboard corner formed at the intersection of inboard surface 335 of vertical wall 325 and the upper inboard surface of lower flange 327 of a respective one of main members 321, directly above its respective hanger 321 (FIGS. 6-8). More specifically, each inboard hanger gusset 371 is seated between and abuts the lower end of its respective plate 313 and its respective main member 321. Each one of a pair of outboard hanger gussets 372 is attached by welding or other suitable means to the bottom outboard corner formed at the intersection of outboard surface 336 of vertical wall 325 and the upper outboard surface of lower flange 327 of a respective one of main members 321, also directly above its respective hanger 323, and is generally transversely-aligned with its respective inboard gusset 371. Inboard and outboard hanger gussets 371, 372 function to react longitudinal fore and aft loads imparted to hangers 323 by the axle/suspension system during operation of the vehicle. More particularly, hanger gussets 371, 372 secure lower flange 327 of main members 321 and prevent crushing or buckling of vertical walls 325 of the main members due to fore-aft loading on hangers 323.

A plurality of longitudinally-spaced, I-shaped openings 341 (only an aligned pair shown) are formed in the upper portion of vertical wall 325 along the length of each main member 321 near upper flange 326, and are each aligned with a corresponding I-shaped opening formed in the other main member 321, as shown in FIG. 4. A plurality of floor sills 322 (only one shown) each extend perpendicularly between main members 321 and respective aligned ones of I-shaped openings 341. Each end 338 of each floor sill 322 passes through its respective opening 341, extends outboardly therefrom, and is fixedly attached to its respective main member by any suitable means such as welding or mechanical fastening. It should be understood that frame 320 of the present invention could also be utilized without floor sills 322, without changing the overall concept or operation of the present invention.

Figure 9:
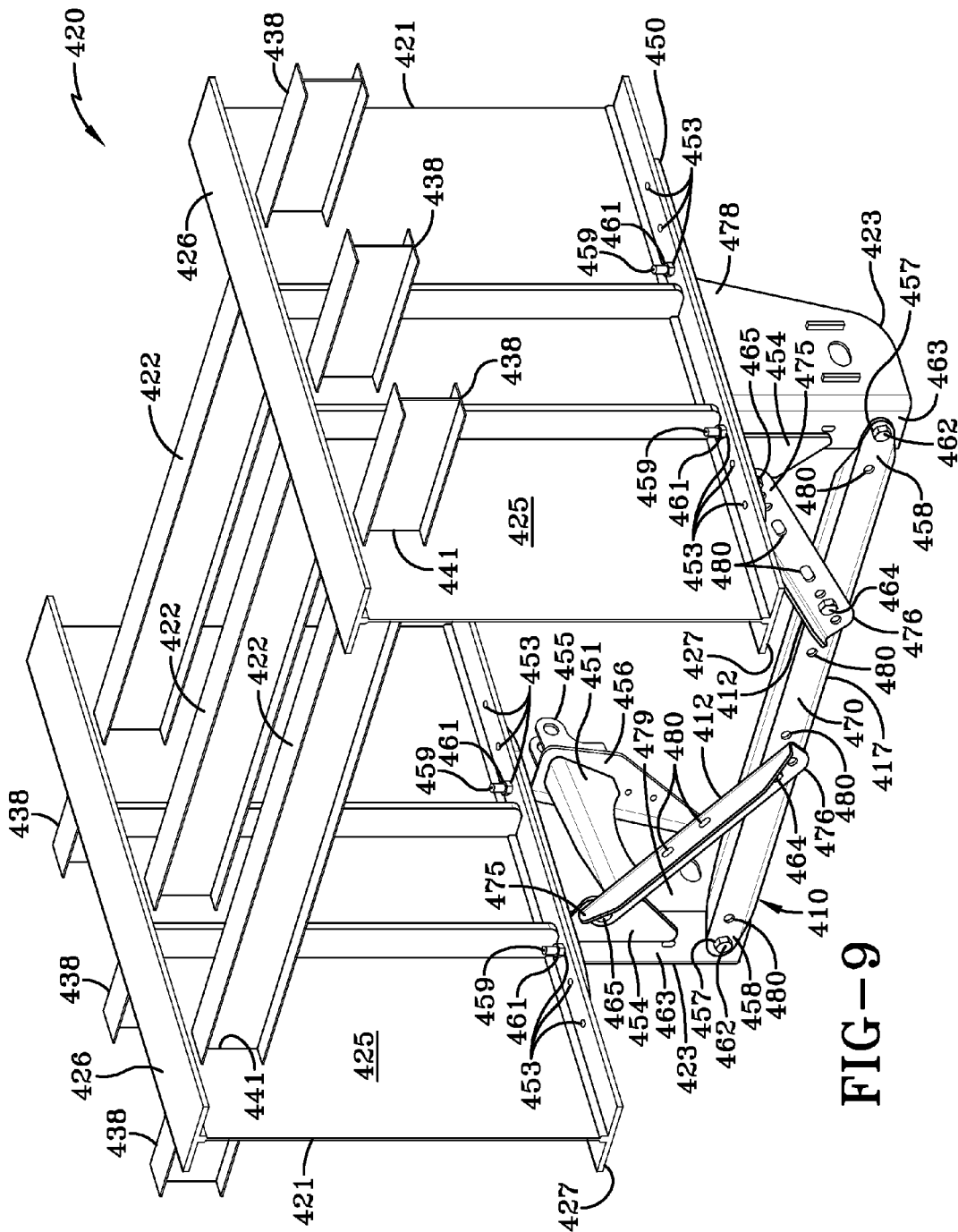
FIG. 9 is a top-front driver's side perspective view of a second embodiment heavy-duty vehicle primary frame of the present invention, showing a pair of spaced-apart longitudinally extending main members with depending hangers, a vertical cross-brace structure bolted to the hangers and the main members, and a plurality of floor sills.
Figure 10:
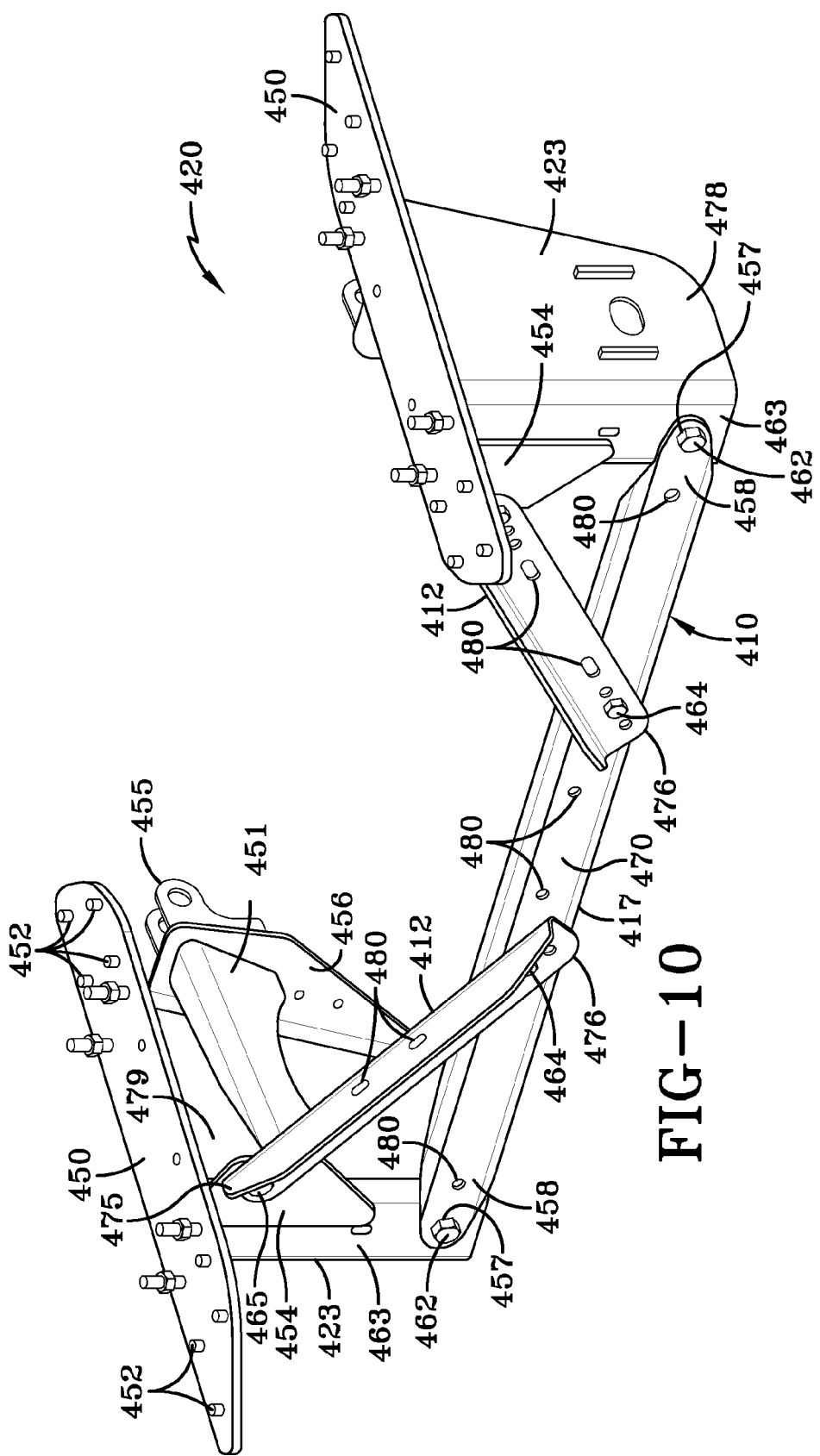
FIG. 10 is a top-front driver's side perspective view of the primary frame shown in FIG. 9, but showing the vertical cross brace without the main members.

A second preferred embodiment primary frame of the present invention is shown in FIGS. 9 and 10, and is indicated generally at 420. With particular reference to FIG. 9, second embodiment primary frame 420 includes a pair of elongated, longitudinally-extending and spaced-apart main members 421, front and rear vertical cross-brace structures 410 (only front structure shown) each bolted on respective front and rear pairs of hangers 423 (only front hangers shown) for suspending axle/suspension systems (not shown) of the type generally described hereinabove for prior art primary frame 120, and a plurality of transversely extending floor sills 422.

Figure 11:
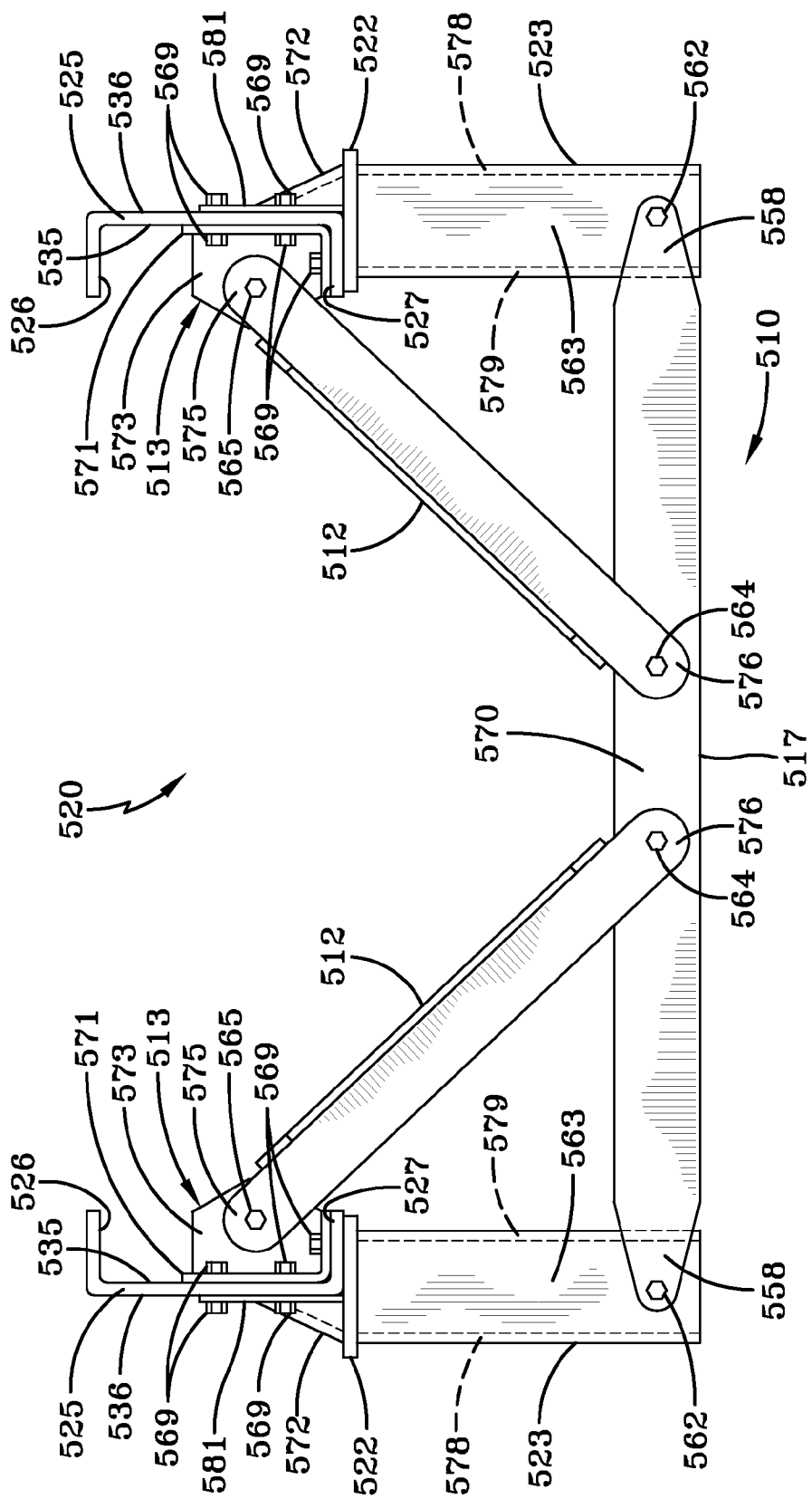
FIG. 11 is a front elevational view of a third embodiment heavy-duty vehicle subframe of the present invention with portions in section and hidden portions represented by broken lines, showing a pair of spaced-apart longitudinally extending main members with depending hangers and a vertical cross-brace structure bolted to the hangers and connected to the main members via a pair of strut brackets.

More particularly, each main member 421 is an I-beam made of steel, aluminum, composite, or other suitable material. Each I-shaped main member 421 includes a vertical wall 425 and top and bottom horizontal flanges 426,427, respectively. Hangers 423 are formed from steel or other suitable robust material. Hanger 423 is a generally elongated U-shaped structure formed with an outboard sidewall 478, an inboard sidewall 479, and a front wall 463 in a manner well known in the art. Each hanger 423 includes a polygonal top plate 450 formed with a plurality of openings 452. Each plate opening 452 is aligned with a main member opening 453 formed in bottom flange 427 of main member 421. A threaded bolt 459 is disposed through each hanger plate opening 452 and its aligned main member opening 453 and a nut 461 is threaded onto the bolt to mount hangers 423 onto main members 421. Alternatively, other types of fasteners, such as a lock bolt could be disposed through each hanger plate opening 452 and its aligned main member opening 453, and fitted with a swaged collar fastener in order to mount hanger 423 on its respective main member 421, without changing the overall concept of the present invention. Moreover, each hanger 423 could be attached to a respective one of main members 421 by welding, as is well known in the art. A transversely extending front triangular gusset 454 is attached via welding or other suitable means of attachment to the bottom surface of top plate 450 and the upper portion of hanger front wall 463, and extends generally downwardly from the bottom surface of the top plate adjacent the front wall of hanger 423. It is understood that hanger top plate 450 serves as a transitional component between hanger 423 and main member 421 and generally functions as an extension of the main member. Hanger 423 further includes a rear wing 456 which extends transversely inboardly from the rear edge of inboard hanger sidewall 479. A clevis 455 for attaching one end of a shock absorber (not shown) to hanger 423 is attached to the rear surface of rear wing 456 in a manner well known in the art, such as welding (FIG. 11). An inboard hanger gusset 451 is attached between inboard hanger wall 479 and rear wing 456 in order to structurally strengthen the rear wing and for maintaining the structural integrity of the hanger. A suspension assembly (not shown) is mounted on the hangers in a manner well known to those of ordinary skill in the art.

In accordance with one of the main features of the present invention, a vertical cross-brace structure 410 extends between and is attached to hangers 423. Vertical cross-brace structure 410 is formed from steel or other suitable robust material. Vertical cross-brace structure 410 includes base member 417 and a pair of inclined members 412. More particularly, horizontally disposed, transversely extending base member 417 includes a central portion 470 having a generally C-shaped cross section and a pair of ends 458, with each of the base member ends being mounted on the front surface of front wall 463 of a respective one of hangers 423. More particularly, an opening 457 is formed in each base member end 458 and is aligned with a respective hanger opening (not shown) formed in hanger front wall 463. A threaded bolt 462 is disposed through each base member opening 457 and aligned hanger opening (not shown) and a nut (not shown) is threaded onto the bolt to attach base member 417 to hangers 423. Additionally, vertical cross-brace structure 410 includes generally L-shaped, frontward-facing inclined members 412, each of which has an upper end 475 and a lower end 476. Lower end 476 of each inclined member 412 is attached to the front surface of base member 417 generally at its central portion by a bolt 464 or other suitable means of attachment, such as welding (not shown). Upper end 475 of each inclined member 412 is attached to a front surface of a respective one of front wings 454 of hangers 423 also by a bolt 465 or other suitable means of attachment, such as welding (not shown). As best shown in FIG. 10, vertical cross-brace structure 410 is a generally K-shaped structure, which is rotated ninety degrees counterclockwise. A plurality of openings 480 are formed in cross-brace structure 410, and function as attachment points for various devices associated with the primary frame, such as a discharge tube on a tanker (not shown). Vertical cross-brace structure 410 functions to react the lateral loads imparted on primary frame 420 from the axle/suspension systems during operation of the vehicle through compression and tension of base member 417 and inclined members 412. This structure reduces or minimizes the number of typically large and heavy cross members, braces, gussets and the like that are required to make prior art frame 120 strong enough to efficiently react the various loads imparted on the frame by the axle/suspension system during operation of the vehicle. Moreover, because second embodiment primary frame 420 is formed by bolting hangers 423 and its associated vertical cross-brace structure 410 directly to main members 421, it is more efficient and economical to manufacture the frame than prior art frame 120, which includes multiple gussets, braces and the like which are welded to the heavy cross members and to the main members. In addition, in some cases frame cross members might be present in the frame that are felt to be inadequate alone to maintain structural integrity of the frame, but the use of forward mounted K Brace structure 410 would provide the additional structural integrity required.

A plurality of longitudinally-spaced, I-shaped openings 441 (only an aligned pair shown) are formed in the upper portion of vertical wall 425 along the length of each main member 421 near upper flange 426, and are each aligned with a corresponding I-shaped opening formed in the other main member 421, as shown in FIG. 9. A plurality of floor sills 422 (only one shown), each having a pair of ends 438, each extend perpendicularly between main members 421 and respective aligned ones of I-shaped openings 441. Each end 438 of each floor sill 422 passes through its respective opening 441, extends outboardly therefrom, and is fixedly attached to its respective main member by any suitable means such as welding or mechanical fastening. It should be understood that frame 420 of the present invention could also be utilized without floor sills 422, without changing the overall concept or operation of the present invention.

Figure 12:
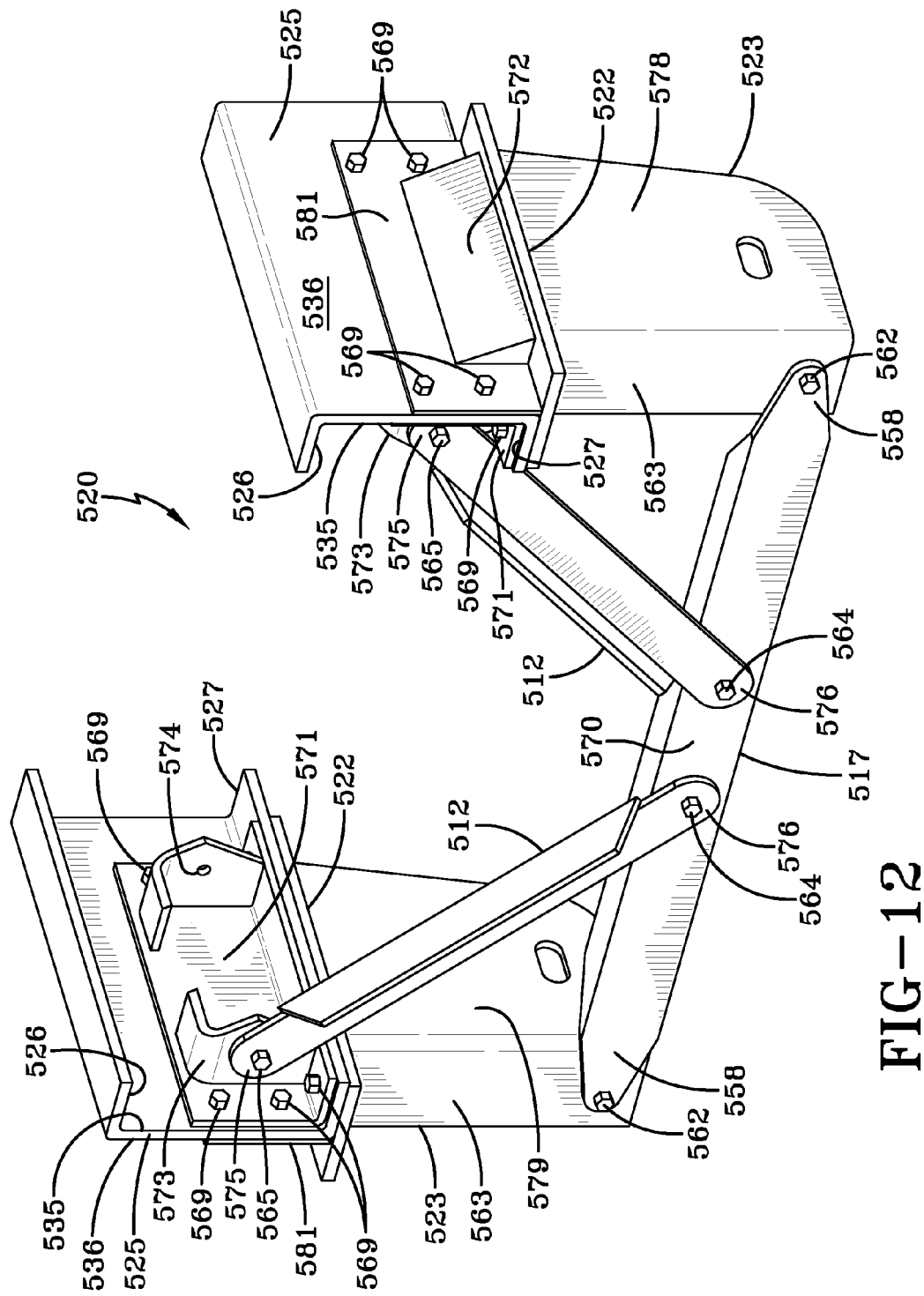
FIG. 12 is top front perspective view of the vertical cross-brace structure shown in FIG. 11.

A third preferred embodiment of the present invention, and specifically an improved heavy-duty vehicle subframe, is indicated generally at 520, and is shown in FIGS. 11-12. The structure and the function of third preferred embodiment subframe 520 of the present invention will be described in detail below.

Specifically, as seen in FIGS. 11 and 12, improved subframe 520 includes a pair of elongated, longitudinally-extending and spaced-apart main members 521, front and rear vertical cross-brace structures 510 (only front structure shown) each attached to respective front and rear pairs of hangers 523 (only front hangers shown) for suspending axle/suspension systems (not shown) of the type generally described hereinabove for prior art primary frame 120.

More particularly, each main member 521 is a beam having a generally C-shaped cross section formed from steel, aluminum, composite, or other suitable material. Main members 521 are connected to each other in spaced-apart parallel relationship by front and rear vertical cross-brace structures 510 (only one shown). Each C-shaped main member 521 includes a vertical wall 525 and upper and lower flanges 526, 527, respectively. Each main member vertical wall 525 includes an inboard surface 535 and an outboard surface 536. Each hanger 523 is attached to a bottom surface of lower flange 527 of a respective one of main members 521 by any suitable means, such as welding, and preferably is of a wingless-type as is well known in the art. Hangers 523 are each formed of steel or other suitable robust material for mounting a suspension assembly on each of the hangers in a manner well-known to those of ordinary skill in the art.

In accordance with one of the main features of the present invention, a vertical cross-brace structure 510 extends between main members 521 and hangers 523, as shown in FIG. 11. Vertical cross-brace structure 510 includes a generally C-shaped, rearward-facing, horizontally disposed, transversely-extending base member 517 having a pair of ends 558, with each base member end being attached to a front surface 563 of a respective one of hangers 523, by any suitable means such as bolts 562. Additionally, vertical cross-brace structure 510 includes a pair of inclined members 512 having a generally L-shaped cross section, each of which has an upper end 575 and a lower end 576. Lower end 576 of each inclined member 512 is attached to the front surface of base member 517 generally at its central portion 570, by suitable fasteners 564 applied at openings (not shown) formed in each of the lower ends of the inclined members. Upper end 575 of each inclined member 512 is attached to a front surface of its respective one of a pair of generally inboardly extending strut brackets 513, by fastener 565 disposed through the openings (not shown) formed in each of the upper ends of the inclined members. More particularly, each strut bracket 513 is a generally L-shaped plate 571 having a pair of inboardly extending brackets 573. Plate 571 is formed with a plurality of openings 577. Each bracket 573 is formed with an opening 574. A selected one of openings 574 receives fastener 565 in order to mount upper end 575 of inclined member 512 to its respective strut bracket 513. Each strut bracket 513 preferably is mounted on inboard surface 535 of vertical wall 325 and the upper surface of lower flange 527 of its respective main member 521. As best seen in FIGS. 11 and 13, vertical cross-brace structure 510 is a generally K-shaped structure that is rotated ninety degrees counterclockwise. Vertical cross-brace structure 510 functions to react the lateral loads imparted on the frame from the axle/suspension systems during operation of the vehicle through compression and tension of base member 517 and inclined members 512, which also transmit these lateral forces into main members 521 via strut brackets 513. This structure reduces or minimizes the number of typically large and heavy cross members, braces, gussets and the like that are required to make the sub frame strong enough to react loads imparted on the subframe by the axle/suspension system during operation of the vehicle. The present invention also eliminates wings of the type that are well known in the art, on hanger 523.

Each one of a pair of top plates 522 is mounted on the top surface of its respective hanger 523 by welds. Each one of a pair of outboard hanger gussets 572 is attached to its respective top plate 522 by welds. Outboard hanger gussets 572 each include a vertical plate 581 that is formed with a plurality of openings 597 (FIG. 13). More specifically, hanger gusset vertical plate 581 is mounted on the bottom portion of the outboard surface 536 of vertical wall 525 of main member 521 directly above its respective hanger 523, and is generally transversely-aligned with its respective inboard strut bracket 513. Vertical plate openings 597 align with openings (not shown) formed in main members 521 and also with openings 577 formed in strut bracket 513 in order to mount vertical cross-brace structure 510 and hangers 523 to main members 521 via fasteners 569. Outboard hanger gussets 572 operate to react longitudinal fore and aft loads imparted to hangers 523 by the axle/suspension system during operation of the vehicle. More particularly, hanger gussets 572 strengthen main members 521 and prevent crushing or buckling of vertical walls 525 of the main members due to fore-aft loading on hangers 523.

Subframe 520 of the present invention is shown without any cross members, however it should be understood that the subframe could also be utilized with one or more crossmembers without changing the overall concept or operation of the present invention.

With respect to frames 320,420,520 of the present invention, this improved frame optimizes cross member structure location for more efficiently reacting vertical and side or lateral loads imparted to the frame during operation of the semi-trailer, yet still reduces the overall weight of the frame from that of other prior art frame designs and provides a stronger and more efficient frame structure.

More particularly, frames 320,420,520 of the present invention replace one or more of the plurality of heavy cross members 162 of conventional prior art primary frames and subframes with vertical cross-brace structures 310,410,510 placed adjacent to depending hangers 323,423,523, respectively, which are attached to the frame and which support the axle/suspension systems of the vehicle. For example, vertical cross-brace structures 310,410,510 more efficiently react vertical and side loads allowing for the elimination of the traditional heavy opposing cross members, thus reducing weight and cost, yet at the same time increasing durability. Moreover, despite the reduction or elimination of the traditional heavy opposing cross members, the placement of vertical cross-brace structures 310,410,510 on depending frame hangers 323,423,523, respectively, still enables dissipation of loads into the entire frame structure adjacent to the front and rear hangers.

As discussed above, an important feature of frames 320, 420,520 of the present invention is vertical cross-brace structures 310,410,510 which improve upon conventional opposing cross members 162 and which reduce or minimize the number of large gussets, braces and the like of the prior art frame designs.

Frames 320,420,520 of the present invention accomplish the above-described improved results due to efficiently locating new vertical cross-brace structures 310,410,510 directly on frame hangers 323,423,523, respectively, the primary location where the load vectors from side loads and vertical loads occur. Moreover, the truss-like configuration of vertical cross-brace structures 310,410,510 aid in reacting loads imparted on the frame by the axle/suspension system during operation of the vehicle through compression and tension of base member 317,417,517 and inclined members 312,412, 512, which also transmit these loads into main members 321,421,521.

Frames 320,420,520 of the present invention result in less cost in the manufacturing process, faster assembly times, and a stronger and lighter frame than prior art frames.

It is understood that other embodiments of heavy-duty vehicle frames 320,420,520 may be manufactured only with one, or more than two, vertical cross-brace structures 310, 410,510 respectively. Other shapes and sizes of individual components of vertical cross-brace structure 310,410,510 namely, base member 317,417,517, inclined members 312, 412,512, gussets 371,372, 572 and plates 313,513, could be used without altering the overall concept of the present invention. For example, base member 317 and inclined members 312 could have a generally L-shaped cross section rather than a generally C-shaped cross section. Likewise, base member 417,517 could have an L-shaped cross-sectional configuration and inclined members 412,512 could have a generally C-shaped cross section. In addition, inclined members 312, 412,512 could be formed with channels or thick straps without changing the overall concept or operation of the present invention. Inclined members 312,412,512 could also be fastened in other ways such as welding, bolts or other fastening means known to those having skill in the art without changing the overall concept or operation of the present invention. Gussets 371,372,572 could be replaced with vertical channels or a collection of web stiffeners in a manner well known in the art without affecting the overall concept of the invention. Plates 313,513 could have a generally rectangular or triangular shape. In addition, other shapes and sizes of main members 321,421,521 and floor sills 322,422, respectively, could be utilized without altering the overall concept of the present invention. For example, main members 321,421 and floor sills 322,422, respectively, could have a generally C-shaped cross section rather than a generally I-shaped cross section. In addition, varying numbers and shapes of floor sills 322,422, such as channel-shaped or rectangular-shaped tubes, could be utilized without altering the overall concept of the present invention. Furthermore, where the axle/suspension systems are arranged in a relatively wide longitudinally spaced tandem or other similar configuration, frames 320,420,520 optionally can include horizontal braces (not shown) disposed between the front and rear axle/suspension systems for additional structural support, as is well known in the art. If horizontal braces are utilized, they preferably are similar to braces 152 of prior art frame 120 and are intended to reduce or eliminate possible parallelogramming of the frame that could occur in certain situations during vehicle operation, such as when vehicle cornering causes scrubbing of tires and produces forces which could otherwise result in possible lateral bending of the frame. Moreover, the present invention applies to frames that are capable of being outfitted with one, two, three, or more axle/suspension systems. In addition, for second preferred embodiment 420, the mounting of base member 417 to hangers 423, the mounting of inclined members 412 to the base member and the hangers, and the mounting of the hangers to main members 421 could also be accomplished by using lock bolts in conjunction with swaged collar fasteners in place of the bolts, as well as other suitable fasteners which are well known in the art. It is even further understood that frames 320,420 of the present invention could be utilized with floor sills 322,422, respectively, and also without the floor sills without changing the overall concept or operation of the present invention. It should be noted that reference hereinabove has been made to first and second preferred embodiment primary frames 320,420 and to third embodiment subframe 520 of the invention with the understanding that such reference is by way of example, and the present invention finds application in all types of heavy-duty vehicle frames known to those skilled in the art, without affecting the concept or operation of the invention.

In addition, while the present invention has been described with reference to a particular type of axle/suspension system, it applies to any suspension system or axle/suspension system known to those skilled in the art.

Accordingly, the improved heavy-duty vehicle frame of the present invention is simplified, provides an effective, safe, inexpensive, and efficient heavy-duty vehicle frame which achieves all the enumerated objectives, provides for eliminating difficulties encountered with prior art frames, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved heavy-duty vehicle frame is constructed, arranged and used, the characteristics of the construction and arrangement, and the advantageous, new and useful results obtained; the new and useful structures, devices, elements, arrangements, parts and combinations, and methods are set forth in the appended claims.

What is claimed is:

1. A frame for a vehicle trailer, said frame comprising:
a) a pair of spaced-apart, parallel, elongated and longitudinally extending main members;
b) a pair of hangers, each one of said hangers being attached to and depending below a lowermost surface of a respective one of said main members;
c) a vertically disposed brace structure extending between and being attached to said hangers and said main members, said brace structure including a hanger cross member spaced from said main members and disposed perpendicularly only between said hangers, and a pair of inclined members, each one of said inclined members extending between and being attached to said hanger cross member and to a respective one of said main members or to a respective one of the main members and a respective one of the hangers.

2. The frame of claim 1, in which said vertically disposed brace structure includes a generally K-shape rotated 90 degrees counterclockwise.

3. The frame of claim 1, in which an axle/suspension system is mounted on said pair of hangers.

4. The frame of claim 1, in which said pair of inclined members further comprise a pair of vertically extending plates, each one of said plates attached to an upper end of a respective one of said inclined members and to a respective one of said main members.

5. The frame of claim 1, in which said primary frame includes two pairs of said hangers; in which one of the hanger pairs is longitudinally spaced from the other one of said hanger pairs; in which said frame includes a pair of said vertically disposed brace structures; in which one of said pair of vertically disposed brace structures is longitudinally spaced from the other one of said pair of vertically disposed brace structures; in which each one of said pair of vertically disposed brace structures extends between and is attached to said main members and a respective pair of said pairs of hangers.

6. The frame of claim 1, in which each one of said pair of hangers further include a top plate formed with a plurality of circular openings, said top plate being attached to a lowermost portion of a respective one of said main members, and in which each one of the pair of hangers further include an upper wing, each of said upper wings being attached to a respective hanger and to a respective main member, each one of said inclined members being attached to a respective one of the upper wings of said hangers.

* * * * *